United States Patent
Oh et al.

[11] Patent Number: 6,076,402
[45] Date of Patent: Jun. 20, 2000

[54] APPARATUS FOR DETECTING AN EXCITING FORCE EXTERNALLY EXERTED ON A VIBRATING GYROSCOPE

[75] Inventors: Jun Ho Oh, Taejun; Sung Wook Park, Busan, both of Rep. of Korea

[73] Assignee: Korea Advanced Institute Science & Technology, Taejun, Rep. of Korea

[21] Appl. No.: 09/104,730

[22] Filed: Jun. 25, 1998

[30] Foreign Application Priority Data

Jul. 10, 1997 [KR] Rep. of Korea ...................... 97-32104

[51] Int. Cl.[7] ........................................................ G01P 9/04
[52] U.S. Cl. ........................................................ 73/504.12
[58] Field of Search ........................ 73/504.12, 504.14, 73/504.04; 310/316, 329, 316.01

[56] References Cited

U.S. PATENT DOCUMENTS 5,520,050 5/1996 Nakamura ............................. 73/504.12
5,648,608 7/1997 Nakamura ............................. 73/504.12

Primary Examiner—John E. Chapman
Attorney, Agent, or Firm—E. Russell Tarleton; Seed and Berry LLP

[57] ABSTRACT

A detector detects an exciting force externally exerted on a vibrating gyroscope by measuring a cross vibration of a regular triangular prism-shaped vibrating body having piezoelectric elements. The detector comprises an oscillator for oscillating the vibrating body at a constant frequency, a differential amplifier for differentially amplifying the piezoelectric voltages from two of the piezoelectric elements, a rectifier for rectifying an alternating current signal from the differential amplifier based on the oscillating phase of the oscillator, a direct current amplifier for amplifying a direct current signal from the rectifier, a controller for controlling output from the direct current amplifier, two operators for operating the oscillating signals from the oscillator with the signals supplied from the controller, and switches for switching on and off the output-lines of the two operators so that the piezoelectric signal supplied to the amplifier becomes a periodic linear signal.

2 Claims, 5 Drawing Sheets

APPARATUS FOR DETECTING AN EXCITING FORCE EXTERNALLY EXERTED ON A VIBRATING GYROSCOPE

TECHNICAL FIELD

This invention relates to a detector for detecting an exciting force externally exerted on a vibrating gyroscope, and more particularly to the detector for providing an improved linearity of an output signal representing an externally exerted angular velocity on the gyroscope.

BACKGROUND ART

A vibrating gyroscope is used, for example, in an image compensation unit of a camcorder, or in a location control unit of a car navigation system. One method to get more exact information is to improve the linearity of the output signal from the vibrating gyroscope.

A conventional vibrating unit 20 used in a vibrating gyroscope, as shown in FIG. 1, is usually formed as a triangular prism. The vibrating unit 20 comprises a regular triangular prism-shaped vibrating body 21 with three monocrystalline and piezoelectric elements 22, 23, and 24 attached on each of three sides of the vibrating body 21, respectively.

In FIG. 1, the vibrating unit 20 is located in a coordinate system that has the origin O on the central axis of the vibrating unit 20, which is coincided with X-axis. The XY-plane of the coordinate system is parallel with the third piezoelectric element 24 and the Z-axis extends perpendicular to the third piezoelectric element 24. The terminology "reference vibration" means vibration in the Z-axis direction in the vibrating body 21 when oscillated by first and second piezoelectric elements 22 and 23 at a constant frequency, while the terminology "cross vibration" means vibration in the Y-axis direction, for example, caused by a Coriolis force that is induced from an angular velocity externally exerted on the vibrating body 21 about the X-axis.

As shown in FIG. 4, a conventional detector for detecting an exciting force in a vibrating gyroscope that has a vibrating unit 20 includes a differential amplifier 30 and a direct current amplifier 40. The differential amplifier 30 differentially amplifies two signals from first and second piezoelectric elements 22 and 23 generated by a composite vibration that includes a reference vibration and cross vibration components.

The oscillating unit 10 provides oscillating energy in the Z-axis direction at a constant frequency through input lines 11 and 12 to the first and second sides of the vibrating body 21. The oscillating energy generates a reference vibration of the vibrating body 21. The third piezoelectric element 24 transforms such vibration into electricity, and then such electricity is used as a feedback signal 13 to the oscillating unit 10. If an angular velocity about X-axis is externally exerted to the vibrating body 21, the Coriolis force created in the vibrating body 21 generates a cross vibration in the Y-axis direction. The cross vibration and the reference vibration produce a composite vibration. The composite vibration is transformed into piezoelectric voltages by the first and second piezoelectric elements 22 and 23. Two piezoelectric voltages are differentially amplified by the differential amplifier 30 to produce a signal corresponding to a difference between one piezoelectric voltage by the first piezoelectric element 22 and the other piezoelectric voltage by the second piezoelectric element 23. If no angular velocity is applied to the vibrating body 21, the output signal of the differential amplifier 30 may be 'zero'. The output signal of the differential amplifier 30 is further amplified by a direct current amplifier 40, and then is supplied to a display 50 as a signal representing the angular velocity.

The conventional detector for detecting an exciting force in a vibrating gyroscope has some shortcomings. The vibration body may be under a composite vibration having both a reference vibration component and a cross vibration component. That is, the vibration body may vibrate in a direction other than the direction of the reference vibration and at a frequency other than the constant frequency. Thus, the phase and intensity of the composite vibration is varied non-linearly, which results in a signal obtained from the output unit that is not linear.

SUMMARY OF INVENTION

The disclosed embodiment is directed to a detector for detecting an exciting force externally exerted on a vibrating gyroscope, while providing an improved linearity of output signal representing the exciting force.

According to the disclosed embodiment, an apparatus for detecting an exciting force externally exerted on a vibrating gyroscope measures a cross vibration in a regular triangular prism-shaped vibrating body with three piezoelectric elements. The cross vibration results from an external exciting force, which is often an angular velocity. The apparatus comprises an oscillator for vibrating the regular triangular prism-shaped vibrating body at a constant frequency, a differential amplifier for differentially amplifying two signals corresponding to cross vibration in the vibrating body measured by piezoelectric elements attached to two sides of the vibrating body, a rectifier for rectifying an alternating current from the differential amplifier based on an oscillating phase of the oscillator, a direct current amplifier for amplifying a direct current from the rectifier, two operators for operating on oscillated signals emitted from the oscillator with feedback signals based on the a cross vibration; and a controller for obtaining the feedback signals from an output of the direct current amplifier and for providing those to the two operators so that a signal inputted to the each piezoelectric element has an intensity changed based on each feedback signal.

The apparatus may further comprise a first pair of electrical switches for switching on and off the output-lines of the two operators to exert an oscillating signal on the regular triangular prism-shaped vibrating body at a constant frequency to cause a reference vibration, and a second pair of electrical switches turned on only when the first pair of switches are turned off so that a signal representing an exciting force has an improved linearity.

Other advantages and features of the present invention will become apparent from the following description, including the drawings and claims.

DETAILED DESCRIPTION OF PREFERRED EMBODIMENTS

Figure 1:
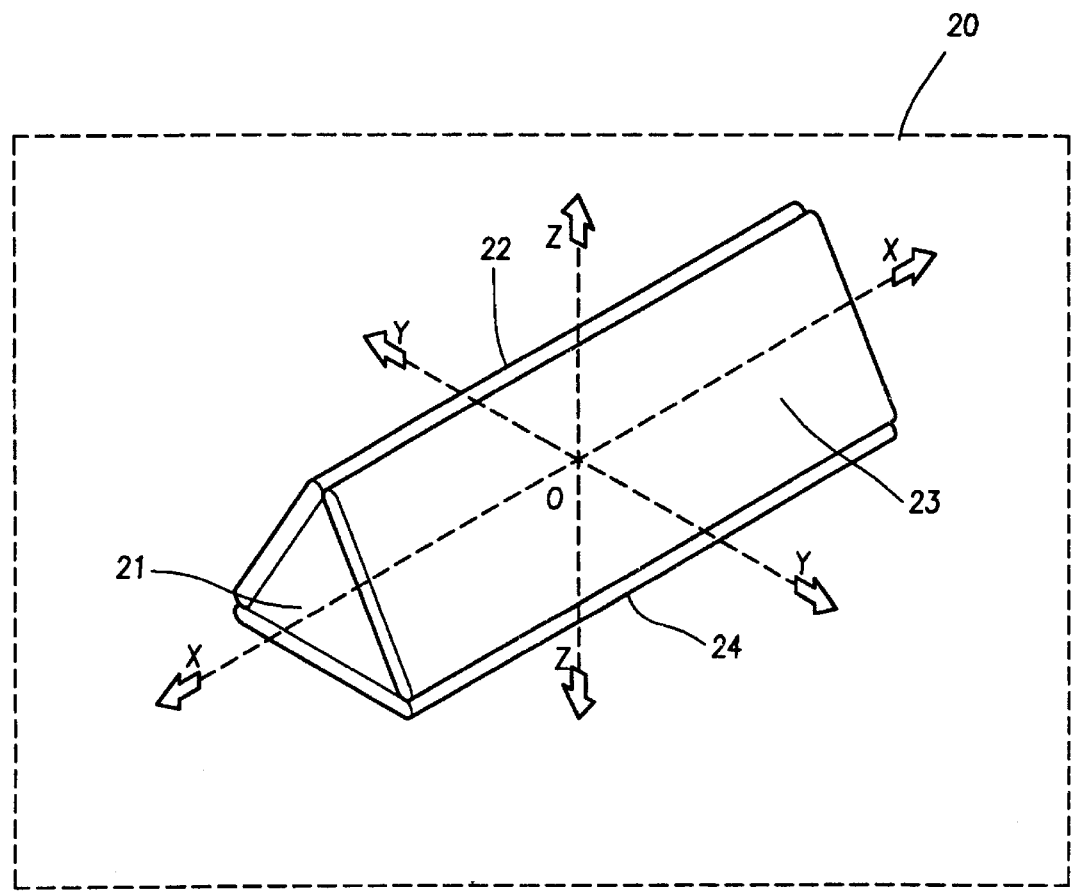
FIG. 1 shows a perspective view of a conventional vibrating gyroscope.
Figure 2:
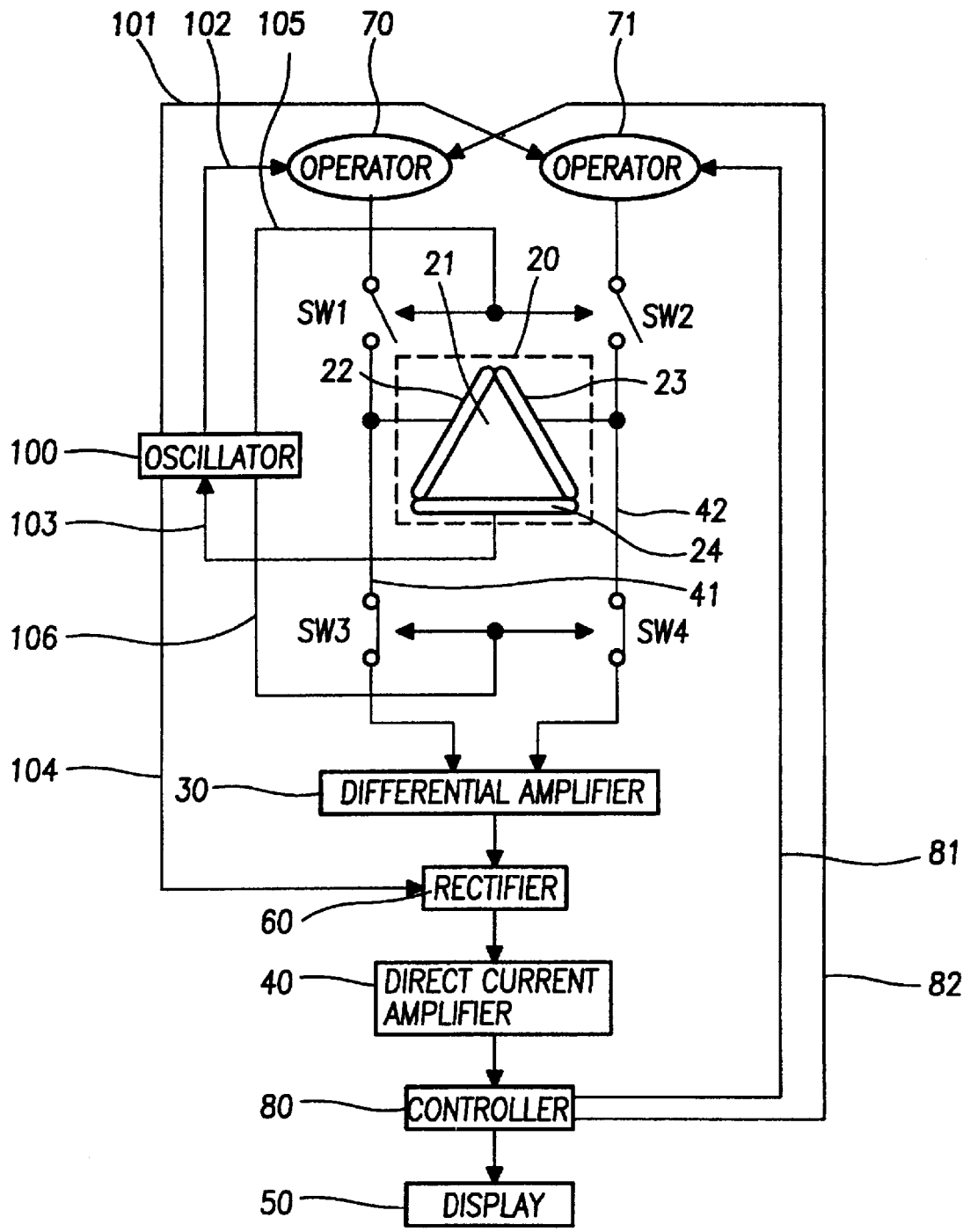
FIG. 2 shows a block diagram of an apparatus for detecting an exciting force externally exerted on a vibrating gyroscope according to an embodiment of the invention.

In one embodiment of the invention as shown in FIG. 2, the apparatus for detecting an exciting force externally exerted on a vibrating gyroscope has an oscillator 100 that may consist of a phase-locked loop having frequency stability. The oscillating signal from the oscillator 100 is supplied to two operators 70 and 71 through lines 101 and 102. The first operator 70 is connected to a first piezoelectric element 22 attached on one side of the vibrating body 20 via an electrical switch SW1, while the second operator 71 is connected to a second piezoelectric element 23 attached on the other side of the vibrating body 20 via an electrical switch SW2. The first and second piezoelectric elements 22 and 23 cooperate to generate a reference vibration in the vibrating body 20. Furthermore, each piezoelectric element 22 or 23 also acts to measure a cross vibration in the regular triangular prism-shaped vibrating body 20. The reference vibration in the vibrating body 20 is measured by a third piezoelectric element 24 attached on the bottom of the vibrating body 20, and then a piezoelectric voltage corresponding the measured reference vibration is fed back to the oscillator 100 through a line 103.

Both operators 70 and 71 are further disconnected from a differential amplifier 30 via an additional electrical switch SW3 when the electrical switch SW1 is conductive and also via an additional electrical switch SW4 when the electrical switch SW2 is conductive. Piezoelectric voltages corresponding to the cross vibration measurements by the first and second piezoelectric elements 22 and 23 are transmitted to the differential amplifier 30 via the electrical switches SW3 and SW4 through lines 41 and 42, respectively. The differential amplifier 30 amplifies the piezoelectric voltage corresponding to the cross vibration measurement by the first piezoelectric element 22 and the piezoelectric voltage corresponding to the cross vibration measurement by the second piezoelectric element 23 differentially. The differential amplifier 30 outputs an alternating current signal to a rectifier 60.

The rectifier 60 rectifies the signal received from the differential amplifier 30 based on the oscillating phase of the oscillator 100, which is transmitted through a line 104. The rectifier 60 outputs a direct current signal to a direct current amplifier 40 and, in turn, to a controller 80.

The controller 80 feeds back the signal to both operators 70 and 71 through lines 81 and 82 after amplification by the direct current amplifier 40. Each operator 70 or 71 operates an oscillating signal supplied from the oscillator 100 with the signal received from the controller 80. Since the signals inputted into the operators 70 and 71 are equal with each other, signals outputted from the operators 70 and 71 toward the first and second piezoelectric elements 22 and 23 are also equal with each other. If no exciting force exerted from the outside, the vibrating body 20 is vibrated in a constant direction and at a constant intensity. The controller 40 outputs a signal corresponding to any external exciting force toward a display 50, which is an exciting force supplied externally rather than from the oscillator 100.

In this embodiment, the electrical switches SW1, SW2, SW3 and SW4 are controlled as follows. Let the electrical switches SW1 and SW2 upstream from the piezoelectric elements 22 and 23 be called a first pair of switches, while the electrical switches SW3 and SW4 downstream from the piezoelectric elements 22 and 23 be called a second pair of switches.

The oscillator 100 controls the first pair of switches through a line 105 and the second pair of switches through a line 106 so that the first pair of switches are turned on only when the second pair of switches are turned off, while the second pair of switches are turned on only when the first pair of switches are turned off. This reverse operation between the first pair and the second pair of switches results in the vibrating body 20 oscillating alternatively with the measuring of the cross vibrations in the vibrating body 20.

Figure 3:
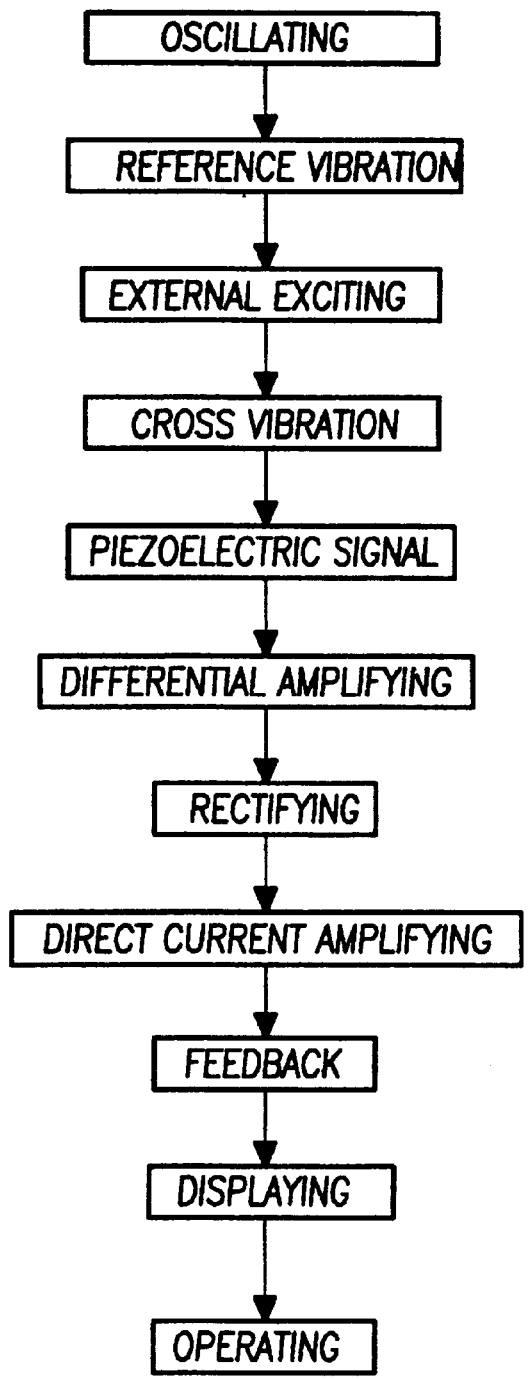
FIG. 3 shows a flow chart for explaining procedures in a method for detecting the exciting force using the apparatus shown in FIG. 2.
Figure 4:
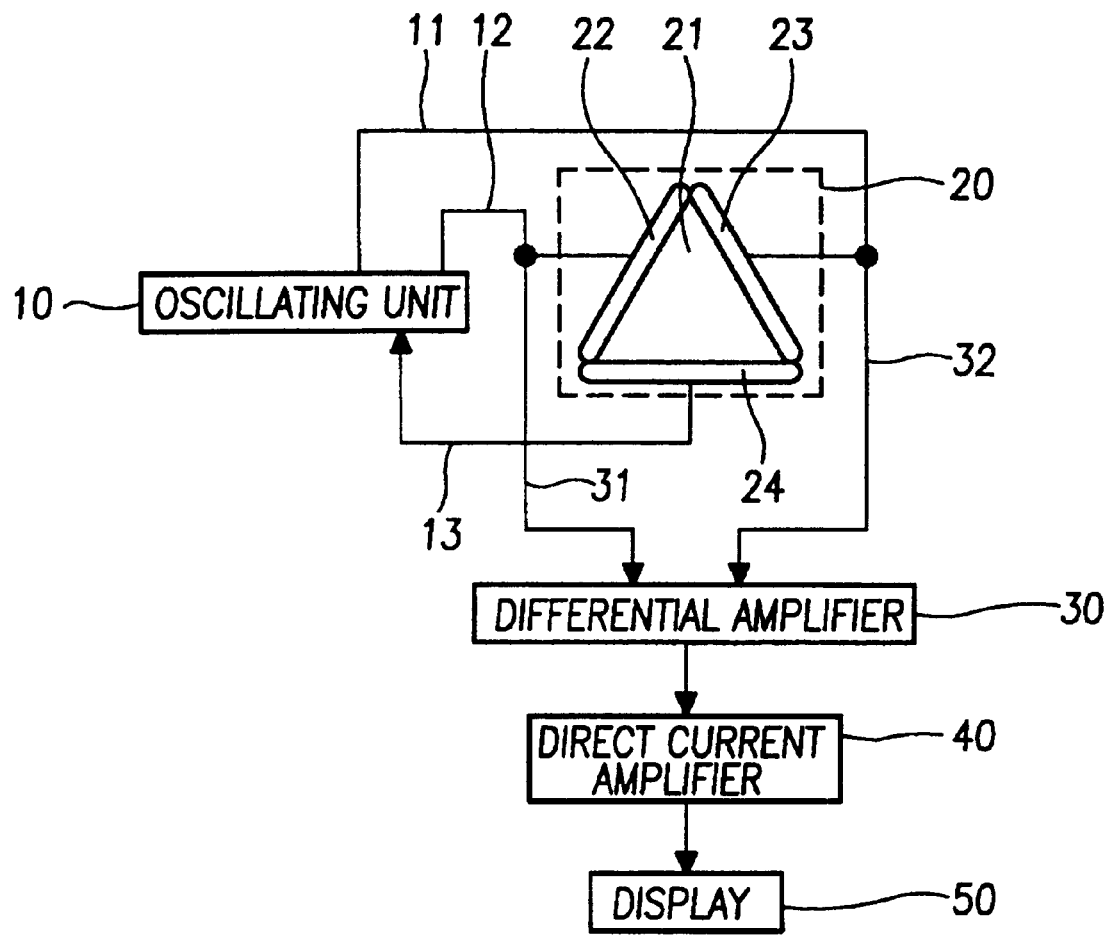
FIG. 4 shows a block diagram of a conventional apparatus for detecting an exciting force externally exerted on a vibrating gyroscope.
Figure 5:
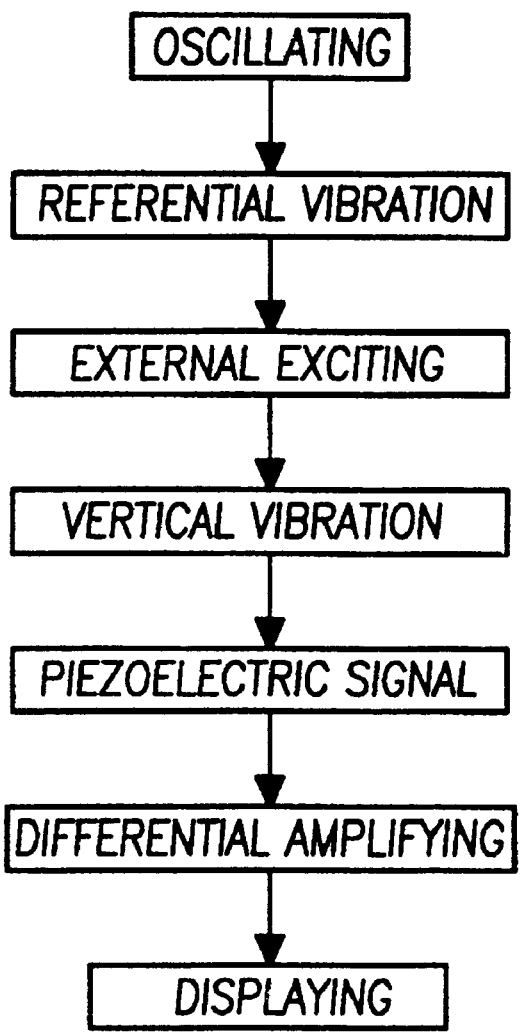
FIG. 5 shows a flow chart for explaining procedures in a conventional method for detecting the exciting force using the apparatus shown in FIG. 4.

Referring to FIG. 3, operation of the apparatus for detecting an exciting force in a vibrating gyroscope in this embodiment will be explained.

When the first pair of switches SW1 and SW2 are turned on, the oscillator 100 transmits an oscillating signal via each operator 70 and 71 to each piezoelectric element 22 or 23 to vibrate the vibrating body 20. Since the oscillating signals inputted to the first and second piezoelectric elements 22 and 23 not only have an even intensity but also are synchronized in phase with each other, a cross vibration generated in the first piezoelectric element 22 balances with a cross vibration generated in the second piezoelectric element 23, and thus only a reference vibration in the Z-axis direction is outputted from the vibrating body 20. Any external exciting force, such as an angular speed about X-axis externally exerted on the vibrating body 20, causes a Coriolis force in the Y-axis direction, by which a cross vibration is generated, and then combined with the reference vibration. Each piezoelectric element 22 or 23 generates a piezoelectric signal corresponding to a composite vibration in the vibrating body 20. The two piezoelectric signals from the two piezoelectric elements 22 and 23 are differentially amplified by the differential amplifier 30. A signal outputted from the differential amplifier 30 is rectified by the rectifier 60 based on the oscillating phase of the oscillator 100. A direct current from the rectifier is amplified by the direct current amplifier 40. The controller 80 supplies feedback currents to the operators 70 and 71 based on the amplified direct current. The feedback currents are operated with oscillated signals from the oscillator 100 in the operators 70 and 71 to produce the next oscillating signals. The phase of oscillating signals supplied to the piezoelectric elements 22 and 23 are substantially equal to the oscillating phase of the oscillator 100. The controller 80 also transmits to the display 50 a signal corresponding to the amplified direct current that is traced to intensities of cross vibration generated in the regular triangular prism-shaped vibrating body 20 due to a foreign exciting force.

What is claimed is:

1. An apparatus for detecting an exciting force externally exerted on a vibrating gyroscope in which the vibrating gyroscope has a regular triangular prism-shaped vibrating body having three piezoelectric elements attached to the three sides, respectively, the apparatus comprising:

an oscillator for vibrating the regular triangular prism-shaped body at a consonant frequency;

a differential amplifier for differentially amplifying two signals generated from two respective piezoelectric elements corresponding to a cross vibration in the vibrating body measured by the piezoelectric elements attached to lateral sides of the vibrating body;

a rectifier for rectifying alternating current from the differential amplifier based on an oscillating phase of the oscillator;

a direct current amplifier for amplifying a direct current from the recifier;

two operators each having an iutput coupled to a respective input on the two piezoelectric elements and configured for operating oscillated signals emitted from the oscillator with feedback signals based on the cross vibration; and a controller for obtaining the feedback signals from an output of the direct current amplifier and for providing the feedback signals to the two operators so that a signal inputted to the each piezoelectric element has an intensity changed based on each feedback signal.

2. The apparatus of claim 1, further comprising a first pair of electrical switches for switching on and off an output line of each of the two operators to exert an oscillating force on the vibrating body at a consonant frequency to cause a reference vibration, and second pair of electronic switches turned on only when the first pair of electronic switches are turned off to control the signals provided by the piezoelectric elements to the differential amplifier so that a signal representing an exciting force has improved linearity.

* * * * *